United States Patent
Zhang et al.

(10) Patent No.: US 9,672,779 B2
(45) Date of Patent: Jun. 6, 2017

(54) LIQUID CRYSTAL DISPLAY DEVICE, BACKLIGHT MODULE, AND DRIVE CIRCUIT FOR BACKLIGHT SOURCE THEREOF

(71) Applicant: Shenzhen China Star Optoelectronics Technology Co., Ltd., Shenzhen, Guangdong (CN)

(72) Inventors: Hua Zhang, Guangdong (CN); Dan Cao, Guangdong (CN)

(73) Assignee: Shenzhen China Star Optoelectronics Technology, Co., Ltd., Shenzhen, Guangdong (CN)

( * ) Notice: Subject to any disclaimer, the term of this patent is extended or adjusted under 35 U.S.C. 154(b) by 0 days.

(21) Appl. No.: 14/417,669

(22) PCT Filed: Jan. 19, 2015

(86) PCT No.: PCT/CN2015/070966
§ 371 (c)(1),
(2) Date: May 5, 2016

(87) PCT Pub. No.: WO2016/095309
PCT Pub. Date: Jun. 23, 2016

(65) Prior Publication Data
US 2016/0247471 A1    Aug. 25, 2016

(30) Foreign Application Priority Data
Dec. 18, 2014    (CN) .......................... 2014 1 0798135

(51) Int. Cl.
*G09G 3/36*    (2006.01)
*H05B 33/08*    (2006.01)
*G09G 3/34*    (2006.01)

(52) U.S. Cl.
CPC ....... *G09G 3/3648* (2013.01); *H05B 33/0815* (2013.01); *H05B 33/0818* (2013.01);
(Continued)

(58) Field of Classification Search
None
See application file for complete search history.

(56) References Cited

U.S. PATENT DOCUMENTS

2011/0084625 A1    4/2011    Tseng
2015/0124003 A1*    5/2015    Mio ..................... G09G 3/3406
                                                               345/690

FOREIGN PATENT DOCUMENTS

CN    103069925 A    4/2013
CN    103117046 A    5/2013
(Continued)

OTHER PUBLICATIONS

International Search Report and Written Opinion, China Jan. 19, 2015.

*Primary Examiner* — Kenneth B Lee, Jr.
(74) *Attorney, Agent, or Firm* — Kim Winston LLP

(57) ABSTRACT

Disclosed is a liquid crystal display device, a backlight module, and a backlight drive circuit. The backlight drive circuit comprises a booster circuit, a light-emitting unit, a circuit for automatic adjustment of current, and a controller. The current flowing through an LED will be altered by the circuit for automatic adjustment of current when extending an adjustable range of the controller, so as to reach the adjustable range of the controller.

13 Claims, 2 Drawing Sheets

(52) U.S. Cl.
CPC ....... *H05B 33/0824* (2013.01); *G09G 3/3406* (2013.01); *G09G 2330/12* (2013.01)

(56) References Cited

FOREIGN PATENT DOCUMENTS

| | | |
|---|---|---|
| CN | 103440848 A | 12/2013 |
| JP | 2009124125 A | 6/2009 |

\* cited by examiner

LIQUID CRYSTAL DISPLAY DEVICE, BACKLIGHT MODULE, AND DRIVE CIRCUIT FOR BACKLIGHT SOURCE THEREOF

CROSS-REFERENCE TO RELATED APPLICATIONS

The present application claims benefit of Chinese patent application CN 201410798135.7, entitled "Liquid crystal display device, backlight module, and drive circuit for backlight source thereof" and filed on Dec. 18, 2014, the entirety of which is incorporated herein by reference.

FIELD OF THE INVENTION

The present disclosure relates to the technical field of liquid crystal displays, and in particular, to a liquid crystal display device, a backlight module, and a drive circuit for backlight source thereof.

BACKGROUND OF THE INVENTION

Recent years, in a thinning display trend, has witnessed wide use of liquid crystal displays (LCDs for short) in various electronic products, such as mobile phones, laptops, and color televisions.

Because liquid crystals per se do not emit light, nor does an LCD panel itself have a light-emitting property, a lighting source, such as a backlight module, is necessary for an LCD. An image forms on the LCD when light from the backlight module passes through liquid crystal molecules, which will twist upon energization of electrodes arranged in the LCD panel. A backlight is an optical component providing a light source at a back face of an LCD product. Therefore, the quality of the backlight will determine important parameters of the LCD product, such as brightness of the display screen, homogeneity of exit light, and color gradation, thereby largely determining lighting effects of the LCD product.

As backlights of LCDs, light-emitting diodes (LEDs) have shown a trend in replacing cold cathode fluorescent lamps (CCFLs). LEDs have the advantages of wide color gamut, superior color reducibility, strong controllability, long service life, free of mercury vapor and other harmful gases, etc. Since an LED is a low-voltage, non-linear semiconductor device, the positive voltage thereof would vary with electric currents and temperatures. This renders a drive circuit necessary to ensure stable and reliable work of the LED. Therefore, study of LED drive circuits used in backlights is a major task to which those skilled dedicated.

FIG. 1 schematically shows a backlight drive circuit in the prior art. As illustrated in FIG. 1, a constant voltage V1 of a constant-current LED driver IC, and a resistor R arranged at a negative terminal of an LED string together determine the size of a current amplitude flowing through the LED string, i.e., I=V1/R. An operational amplifier arranged inside the constant-current LED driver IC can feedback the voltage applied to the resistor R, and then determine the value of a current flowing between the source and the drain of a MOS transistor Q2 located at the negative terminal of the LED string, i.e., the current flowing through the LED string, via adjustment of activation or deactivation of the MOS transistor Q2.

However, the constant-current LED driver IC has limited capacity in adjusting currents due to a manufacturing procedure of a semiconductor and price factors. As a result, a predetermined current value will not be achieved through adjustment by the constant-current LED driver IC beyond a specific range. In addition, when the above circuit is used, the value of the current flowing through the LED would be subject to relatively large errors with respect to the predetermined current value.

Therefore, it is a major issue in the art to solve the above problem, so as to adjust the current flowing through the LED to a predetermined value with reduced errors.

SUMMARY OF THE INVENTION

One of the technical problems to be solved by the present disclosure is to provide a backlight drive circuit, which can enable the current flowing through an LED to reach an adjustable range, and to approach a predetermined value with reduced errors. The present disclosure further provides a liquid crystal display device and a backlight module.

In order to solve the above problem, the present disclosure provides a backlight drive circuit, comprising: a booster circuit, which boosts an input voltage to a working voltage as required; a light-emitting unit, which is electrically connected to the booster circuit and works based on the working voltage therefrom; a current sensing resistor, in series connection to the light-emitting unit; a circuit for automatic adjustment of current, which is electrically connected to the current sensing resistor, and compares a detected voltage of the current sensing resistor with a predetermined reference voltage, so as to adjust the value of a resistor in series connection to the light-emitting unit, and thus to regulate current flowing through the light-emitting unit; and a controller, which is electrically connected to the light-emitting unit, and detects a relationship between an actual voltage corresponding to a current fed back by the light-emitting unit and a predetermined, internal voltage thereof, so as to generate a pulse width modulation signal for controlling the current flowing through the light-emitting unit.

In one embodiment, the circuit for automatic adjustment of current further comprises: a first comparator, which compares the detected voltage of the current sensing resistor with a predetermined, first reference voltage, and outputs a switch signal according to a comparison result; a second comparator, which compares the detected voltage of the current sensing resistor with a predetermined, second reference voltage, and outputs a switch signal according to a comparison result; a first switch, which has a control terminal electrically connected to the first comparator, and performs an operation of turn-on or turn-off in accordance with the switch signal from the first comparator; a first resistor, which is in parallel connection to the first switch, and in series connection to the current sensing resistor along with the first switch; a second switch, which has a control terminal electrically connected to the second comparator, and performs an operation of turn-on or turn-off in accordance with the switch signal from the second comparator; and a second resistor, which is in series connection to the second switch, and in parallel connection to the current sensing resistor along with the second switch, wherein when the detected voltage of the current sensing resistor is higher than the first reference voltage, the first comparator outputs a turn-off signal, while when the detected voltage of the current sensing resistor is lower than the second reference voltage, the second comparator outputs a turn-on signal.

In one embodiment, the backlight drive circuit further comprises a third switch electrically connected to the light-emitting unit and the controller, respectively.

In one embodiment, the light-emitting unit is in the form of a light-emitting diode string.

In one embodiment, the first reference voltage of the first comparator is 5% higher than the predetermined, internal voltage of the controller, and the second reference voltage of the second comparator is 5% lower than the predetermined, internal voltage of the controller.

In one embodiment, the circuit for automatic adjustment of current further comprises two resistors in series connection to each other at a connection point, which is electrically connected to the control terminal of the first switch, wherein an end of one resistor is connected to a DC voltage, and an end of the other resistor is connected to the ground.

According to another aspect of the present disclosure, a backlight module is further provided, comprising: a rear panel having a space, and a backlight drive circuit arranged in the space. The backlight drive circuit including: a booster circuit, which boosts an input voltage to a working voltage as required; a light-emitting unit, which is electrically connected to the booster circuit and works based on the working voltage therefrom; a current sensing resistor, in series connection to the light-emitting unit; a circuit for automatic adjustment of current, which is electrically connected to the current sensing resistor, and compares a detected voltage of the current sensing resistor with a predetermined reference voltage, so as to adjust the value of a resistor in series connection to the light-emitting unit, and thus to regulate current flowing through the light-emitting unit; and a controller, which is electrically connected to the light-emitting unit, and detects a relationship between an actual voltage corresponding to a current fed back by the light-emitting unit and a predetermined, internal voltage thereof, so as to generate a pulse width modulation signal for controlling the current flowing through the light-emitting unit.

In one embodiment, the circuit for automatic adjustment of current further comprises: a first comparator, which compares the detected voltage of the current sensing resistor with a predetermined, first reference voltage, and outputs a switch signal according to a comparison result; a second comparator, which compares the detected voltage of the current sensing resistor with a predetermined, second reference voltage, and outputs a switch signal according to a comparison result; a first switch, which has a control terminal electrically connected to the first comparator, and performs an operation of turn-on or turn-off in accordance with the switch signal from the first comparator; a first resistor, which is in parallel connection to the first switch, and in series connection to the current sensing resistor along with the first switch; a second switch, which has a control terminal electrically connected to the second comparator, and performs an operation of turn-on or turn-off in accordance with the switch signal from the second comparator; and a second resistor, which is in series connection to the second switch, and in parallel connection to the current sensing resistor along with the second switch, wherein when the detected voltage of the current sensing resistor is higher than the first reference voltage, the first comparator outputs a turn-off signal, while when the detected voltage of the current sensing resistor is lower than the second reference voltage, the second comparator outputs a turn-on signal.

In one embodiment, the backlight module further comprises a third switch electrically connected to the light-emitting unit and the controller, respectively.

In one embodiment, the first reference voltage of the first comparator is 5% higher than the predetermined, internal voltage of the controller, and the second reference voltage of the second comparator is 5% lower than the predetermined, internal voltage of the controller.

According to still another aspect of the present disclosure, a liquid crystal display device is further provided, comprising: a liquid crystal display panel, and a backlight module arranged opposite to the liquid crystal display panel, wherein the backlight module includes the backlight drive circuit as described above.

Compared with the prior art, one or more embodiments of the present disclosure has the following advantages.

According to the present disclosure, the circuit for automatic adjustment of current is incorporated into the backlight drive circuit, and thus can alter the value of a resistor in series connection to the LED when the current flowing through the LED extends the adjustable range of the controller, e.g., the constant-current LED driver IC. Thus, the current flowing through the LED can be adjusted to reach the adjustable range of the constant-current LED driver IC, and to increasingly approach a predetermined value (which can be calculated according to the working voltage) with reduced errors.

Other features and advantages of the present disclosure will be further explained in the following description, and partly become self-evident therefrom, or be understood through implementation of the present disclosure. The objectives and advantages of the present disclosure will be achieved through the structure specifically pointed out in the description, claims, and the accompanying drawings.

BRIEF DESCRIPTION OF THE DRAWINGS

The drawings are provided for further understanding of the present disclosure, and constitute one part of the description. They serve to explain the present disclosure in conjunction with the embodiments, rather than to limit the present disclosure in any manner. In the drawings.

DETAILED DESCRIPTION OF THE EMBODIMENTS

In order to present the purpose, technical solution, and advantages of the present disclosure more explicitly, the present disclosure will be further explained in detail in connection with the accompanying drawings.

Figure 1:
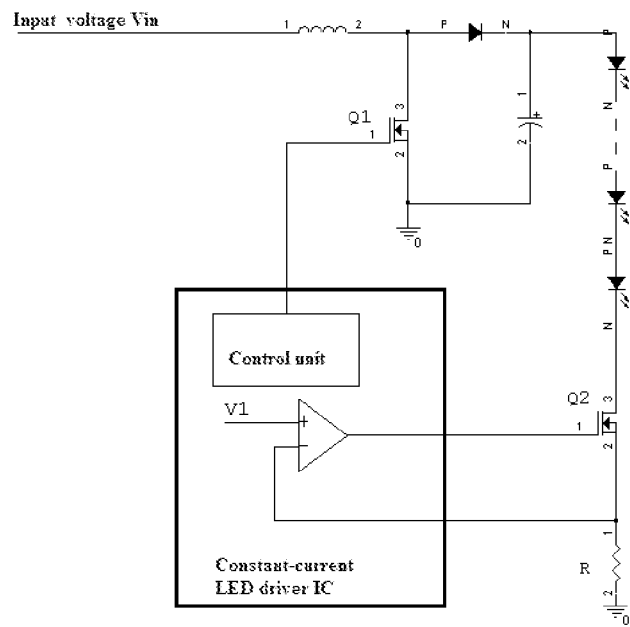
FIG. 1 schematically shows a backlight drive circuit in the prior art.
Figure 2:
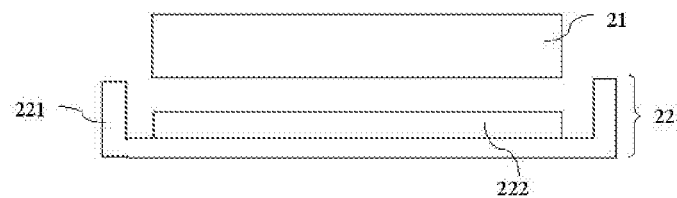
FIG. 2 schematically shows the structure of a liquid crystal display device according to an embodiment of the present disclosure.

FIG. 2 schematically shows the structure of a liquid crystal display device according to an embodiment of the present disclosure. The structure of each component of the liquid crystal display device will be explained in the following with reference to FIG. 2.

As shown in FIG. 2, the liquid crystal display device comprises a liquid crystal display panel 21, and a backlight module 22 arranged opposite to the liquid crystal display panel 21. The backlight module 22 has a rear panel 221 and a backlight drive circuit 222. In the rear panel 221 there is provided with a space, which accommodates the backlight drive circuit 222 used for providing a required light source to the liquid crystal display panel 21.

Figure 3:
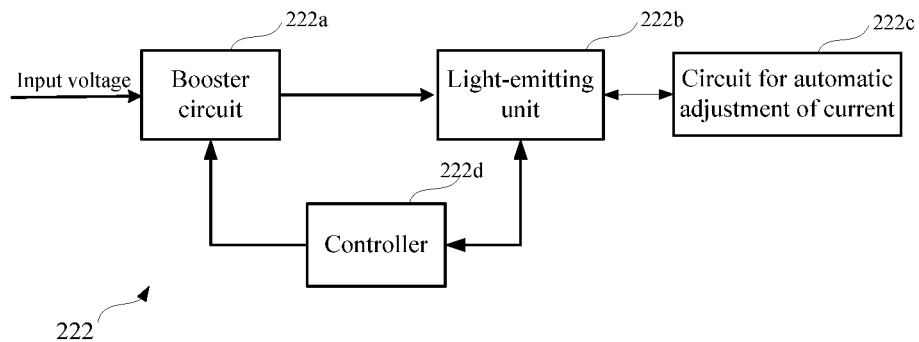
FIG. 3 shows a functional diagram of a backlight drive circuit according to an embodiment of the present disclosure.
Figure 4:
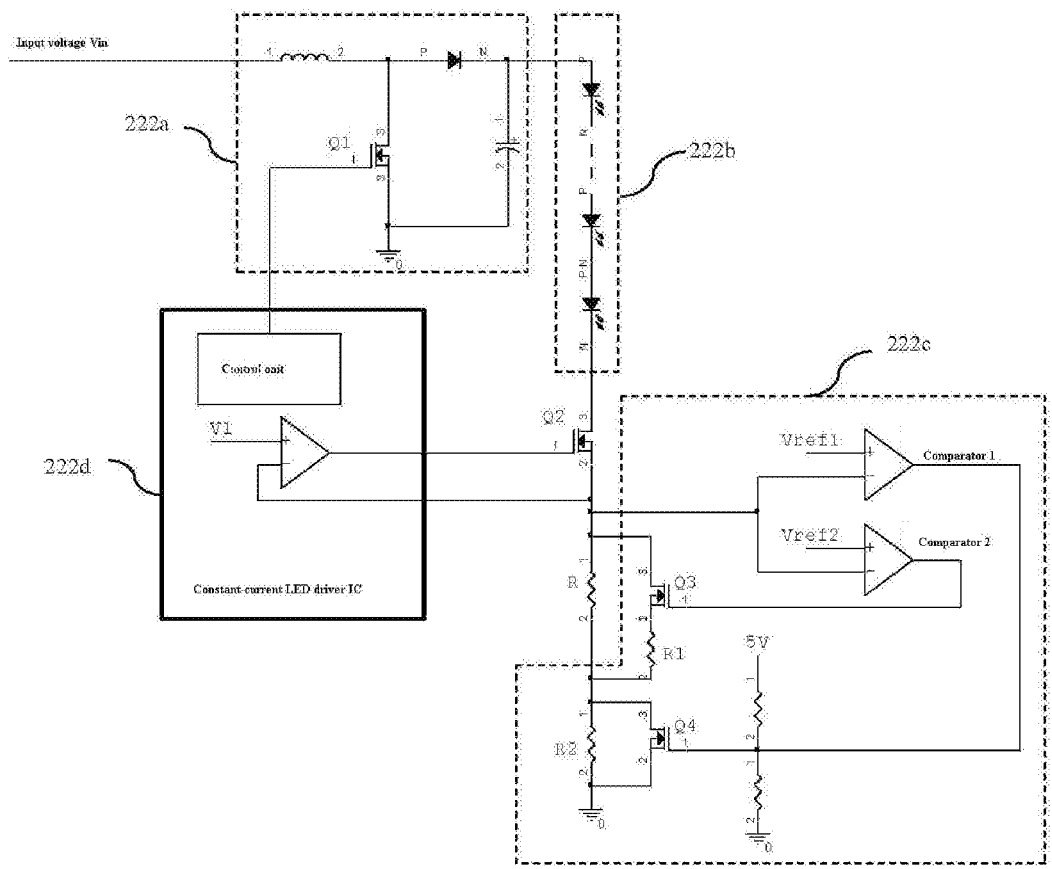
FIG. 4 schematically shows the backlight drive circuit as indicated in FIG. 3.

FIGS. 3 and 4 will be referred to in the following to illustrate the backlight drive circuit according to an embodiment of the present disclosure. FIG. 3 shows a functional diagram of a backlight drive circuit according to an embodiment of the present disclosure, and FIG. 4 schematically shows the backlight drive circuit indicated in FIG. 3.

As FIG. 3 shows, the backlight drive circuit 222 comprises a booster circuit 222a, a light-emitting unit 222b, a current sensing resistor (not shown), a circuit 222c for automatic adjustment of current, and a controller 222d, wherein electrical connection of the booster circuit 222a to the light-emitting unit 222b, series connection between the current sensing resistor and the light-emitting unit 222b, electrical connection of the controller 222d respectively to the booster circuit 222a and the light-emitting circuit 222b, and electrical connection between the circuit 222c for automatic adjustment of current and the light-emitting unit 222b are respectively enabled.

As indicated in FIG. 4, the booster circuit 222a is in the form of an inductive booster circuit, used for boosting an input voltage signal to a working voltage as required. The booster circuit 222a comprises an inductor, a switch transistor Q1, a diode, and a capacitor.

Specifically, in the booster circuit 222a, the inductor is used as an energy convertor for conversion of electric energy and magnetic energy to each other. When the switch transistor Q1 is activated, the inductor transforms electric energy into magnetic energy and store the magnetic energy. When the switch transistor is deactivated, the inductor will transform the stored magnetic energy into electric energy, which, after superposition with the input voltage, will be filtered through the diode and the capacitor, to generate a smooth DC voltage to be provided to a load. Since such a DC voltage is generated after superposition of the input voltage and the electric energy transformed from the magnetic energy of the inductor, it will be higher than the input voltage.

In the present embodiment, for the sake of convenience, the light-emitting unit 222b is provided as a light-emitting diode. Absolutely, those skilled in the art can arrange a plurality of light-emitting diode strings as required. It can be readily understood that, a corresponding circuit for automatic adjustment of current should be added for each light-emitting diode string.

The controller 222d is in the form of a constant-current LED driver IC. The circuit 222c for automatic adjustment of current comprises a comparator 1, a comparator 2, a switch Q3, a switch Q4, a resistor R1, and a resistor R2, wherein electrical connection between the comparator 1 and a control terminal (gate) of the switch Q4, parallel connection between the switch Q4 and the resistor R2, series connection of the switch Q4 along with the resistor R2 to the current sensing resistor R, electrical connection between the comparator 2 and a control terminal (gate) of the switch Q3, series connection between the switch Q3 and the resistor R1, and parallel connection of the switch Q3 along with the resistor R1 to the current sensing resistor R are respectively enabled. The circuit 222c for automatic adjustment of current further comprises a switch Q2 electrically connected to the light-emitting unit 222b and the controller 222d, respectively.

The operation procedure of the entire backlight drive circuit 222 will be further illustrated in detail with reference to FIG. 4 again. The booster circuit 222a receives the input voltage and boosters the input voltage to the working voltage as required. The light-emitting unit 222b works according to the working voltage from the booster circuit 222a to achieve a required brightness.

In the prior art, the value of the current sensing resistor R can be selected on the basis of a required current (I=V1/R) of the LED string. When the constant-current LED driver IC works, it will strive to adjust the voltage of the resistor R to equal a predetermined, internal voltage V1, so as to enable the current flowing through the LED string to be the required current. However, current can be adjustable by the constant-current LED driver IC only within a limited range, in which an accurate current can be obtained. Beyond such a range, major errors would occur.

Such being the case, in order to prevent the current flowing through the LED string from extending the adjustable range of the constant-current LED driver IC, the circuit 222c for automatic adjustment of current should also start working as the light-emitting unit 222b works.

As shown in FIG. 4, a constant voltage Vref1=(1+5%)V1 is applied to a positive input terminal of the comparator 1, and a constant voltage Vref2=(1−5%)V1 is applied to a positive input terminal of the comparator 2, wherein V1 refers to a predetermined, internal voltage of the constant-current LED driver IC, and can be regarded as a working voltage required by the LED string also. Negative input terminals of the two comparators are both connected to an upper end of the current sensing resistor R. An output terminal of the comparator 1 is connected to the gate of the MOS transistor Q4, and an output terminal of the comparator 2 is connected to the gate of the MOS transistor Q3. It can be readily understood, while Vref1 and Vref2 are predetermined as aforementioned in the present embodiment, they can be determined as other values as actually required.

Specifically, the comparator 1 and the comparator 2 will detect the voltage of the current sensing resistor R. If the detected voltage extends (1+5%)V1, the comparator 1 will output a low voltage and the MOS transistor Q4 will be deactivated, such that the resistor R2, along with the current sensing resistor R, will be connected to the LED string in series connection. This will add to the resistance of the circuit, so that the current flowing through the LED can be lowered to a range adjustable by the constant-current LED driver IC. When the voltage of the current sensing resistor R is lower than (1−5%)V1, the comparator 2 will output a high voltage, and the MOS transistor Q3 will be activated, such that the resistor R1, along with the current sensing resistor R, will be connected to the LED string in parallel connection. This will decrease the resistor of the circuit, and thus enable the current flowing through the LED string to reach the range adjustable by the constant-current LED driver IC.

If the voltage of the current sensing resistor R is lower than (1+5%)V1 and higher than (1−5%)V1, then no additional, external resistor will be connected thereto, either in series or in parallel connection. In other words, the comparator 1 will output a high voltage, and the MOS transistor Q4 will be activated, so that the resistor R2 will be subjected to a short connection. And the comparator 2 will output a low voltage, and the MOS transistor Q3 will be deactivated, so that the resistor R1 will be disconnected.

In addition, the circuit 222c for automatic adjustment of current further comprises two resistors in series connection to each other at a connection point, which is electrically connected to the gate of the switch Q4, wherein an end of one resistor is connected to a DC voltage of 5 V, and an end of the other resistor is connected to the ground.

In view of the operation of the above circuit, the constant-current LED driver IC performs a real-time detection of a relationship between the actual voltage corresponding to the current fed back by the light-emitting unit 222b, and the predetermined, internal voltage thereof, and then generate a pulse width modulation signal, so as to regulate the switch Q2 and thus to regulate the current flowing through light-emitting unit 222b. The operation of the circuit 222c for automatic adjustment of current would enable the current flowing through the LED string to constantly stay within the range adjustable by the constant-current LED driver IC with reduced errors.

To conclude the above, in the liquid crystal display device, the backlight module, and the backlight drive circuit according to the present disclosure, the circuit for automatic adjustment of current is used to detect the relationship between the voltage of the current sensing resistor in series connection to the light-emitting unit, and the reference voltage, so as to alter the value of the resistor in series connection to the light-emitting unit. This can alter the current flowing through the light-emitting unit, thus effectively avoiding large errors caused when the current flowing through the light-emitting unit extends the range adjustable by the controller.

The above description should not be construed as limitations of the present disclosure, but merely as exemplifications of preferred embodiments thereof. Any variations or replacements that can be readily envisioned by those skilled in the art are intended to be within the scope of the present disclosure. Hence, the scope of the present disclosure should be subject to the scope defined in the claims.

The invention claimed is:

1. A backlight drive circuit, comprising:
   a booster circuit, which boosts an input voltage to a working voltage as required,
   a light-emitting unit, which is electrically connected to the booster circuit and works based on the working voltage therefrom,
   a current sensing resistor, in series connection to the light-emitting unit,
   a circuit for automatic adjustment of current, which is electrically connected to the current sensing resistor, and compares a detected voltage of the current sensing resistor with a predetermined reference voltage, so as to adjust the value of a resistor in series connection to the light-emitting unit, and thus to regulate current flowing through the light-emitting unit, and
   a controller, which is electrically connected to the light-emitting unit, and detects a relationship between an actual voltage corresponding to a current fed back by the light-emitting unit and a predetermined, internal voltage thereof, so as to generate a pulse width modulation signal for controlling the current flowing through the light-emitting unit;
   wherein the circuit for automatic adjustment of current further comprises:
   a first comparator, which compares the detected voltage of the current sensing resistor with a predetermined, first reference voltage, and outputs a switch signal according to a comparison result,
   a second comparator, which compares the detected voltage of the current sensing resistor with a predetermined, second reference voltage, and outputs a switch signal according to a comparison result,
   a first switch, which has a control terminal electrically connected to the first comparator, and performs an operation of turn-on or turn-off in accordance with a switch signal from the first comparator,
   a first resistor, which is in parallel connection to the first switch, and in series connection to the current sensing resistor along with the first switch,
   a second switch, which has a control terminal electrically connected to the second comparator, and performs an operation of turn-on or turn-off in accordance with a switch signal from the second comparator, and
   a second resistor, which is in series connection to the second switch, and in parallel connection to the current sensing resistor along with the second switch,
   wherein when the detected voltage of the current sensing resistor is higher than the first reference voltage, the first comparator outputs a turn-off signal, while when the detected voltage of the current sensing resistor is lower than the second reference voltage, the second comparator outputs a turn-on signal.

2. The backlight drive circuit according to claim 1, further comprising a third switch electrically connected to the light-emitting unit and the controller, respectively.

3. The backlight drive circuit according to claim 1, wherein the light-emitting unit is in the form of a light-emitting diode string.

4. The backlight drive circuit according to claim 1, wherein:
   the first reference voltage of the first comparator is 5% higher than the predetermined, internal voltage of the controller; and
   the second reference voltage of the second comparator is 5% lower than the predetermined, internal voltage of the controller.

5. The backlight drive circuit according to claim 1, wherein the circuit for automatic adjustment of current further comprises two resistors in series connection to each other at a connection point, which is electrically connected to the control terminal of the first switch, and
   wherein an end of one resistor is connected to a DC voltage, and an end of the other resistor is connected to the ground.

6. A backlight module, comprising:
   a rear panel having a space; and
   a backlight drive circuit arranged in the space, the backlight drive circuit including:
   a booster circuit, which boosts an input voltage to a working voltage as required,
   a light-emitting unit, which is electrically connected to the booster circuit and works based on the working voltage therefrom,
   a current sensing resistor, in series connection to the light-emitting unit,
   a circuit for automatic adjustment of current, which is electrically connected to the current sensing resistor, and compares a detected voltage of the current sensing resistor with a predetermined reference voltage, so as to adjust the value of a resistor in series connection to the light-emitting unit, and thus to regulate current flowing through the light-emitting unit, and
   a controller, which is electrically connected to the light-emitting unit, and detects a relationship between an actual voltage corresponding to a current fed back by the light-emitting unit and a predetermined, internal voltage thereof, so as to generate a pulse width modulation signal for controlling the current flowing through the light-emitting unit;
   wherein the circuit for automatic adjustment of current further comprises:
   a first comparator, which compares the detected voltage of the current sensing resistor with a predetermined, first reference voltage, and outputs a switch signal according to a comparison result a second comparator, which compares the detected voltage of the current sensing resistor with a predetermined, second reference voltage, and outputs a switch signal according to a comparison result, a first switch, which has a control terminal electrically connected to the first comparator, and performs an operation of turn-on or turn-off in accordance with the switch signal from the first comparator, a first resistor, which is in parallel connection to the first switch, and in series connection to the current sensing resistor along with the first switch, a second switch, which has a control terminal electrically connected to the second comparator, and performs an operation of turn-on or turn-off in accordance with the switch signal from the second comparator, and a second resistor, which is in series connection to the second switch, and in parallel connection to the current sensing resistor along with the second switch, wherein when the detected voltage of the current sensing resistor is higher than the first reference voltage, the first comparator outputs a turn-off signal, while when the detected voltage of the current sensing resistor is lower than the second reference voltage, the second comparator outputs a turn-on signal.

7. The backlight module according to claim 6, further comprising a third switch electrically connected to the light-emitting unit and the controller, respectively.

8. The backlight module according to claim 6, wherein:
the first reference voltage of the first comparator is 5% higher than the predetermined, internal voltage of the controller; and
the second reference voltage of the second comparator is 5% lower than the predetermined, internal voltage of the controller.

9. A liquid crystal display device, comprising:
a liquid crystal display panel, and
a backlight module arranged opposite to the liquid crystal display panel, wherein the backlight module includes a backlight module drive circuit, which has:
a booster circuit, which boosts an input voltage to a working voltage as required,
a light-emitting unit, which is electrically connected to the booster circuit and works based on the working voltage therefrom,
a current sensing resistor, in series connection to the light-emitting unit,
a circuit for automatic adjustment of current, which is electrically connected to the current sensing resistor, and compares a detected voltage of the current sensing resistor with a predetermined reference voltage, so as to adjust the value of a resistor in series connection to the light-emitting unit, and thus to regulate current flowing through the light-emitting unit, and
a controller, which is electrically connected to the light-emitting unit, and detects a relationship between an actual voltage corresponding to a current fed back by the light-emitting unit and a predetermined, internal voltage thereof, so as to generate a pulse width modulation signal for controlling the current flowing through the light-emitting unit;
wherein the circuit for automatic adjustment of current further comprises:
a first comparator, which compares the detected voltage of the current sensing resistor with a predetermined, first reference voltage, and outputs a switch signal according to a comparison result,
a second comparator, which compares the detected voltage of the current sensing resistor with a predetermined, second reference voltage, and outputs a switch signal according to a comparison result,
a first switch, which has a control terminal electrically connected to the first comparator, and performs an operation of turn-on or turn-off in accordance with a switch signal from the first comparator,
a first resistor, which is in parallel connection to the first switch, and in series connection to the current sensing resistor along with the first switch,
a second switch, which has a control terminal electrically connected to the second comparator, and performs an operation of turn-on or turn-off in accordance with a switch signal from the second comparator, and
a second resistor, which is in series connection to the second switch, and in parallel connection to the current sensing resistor along with the second switch,
wherein when the detected voltage of the current sensing resistor is higher than the first reference voltage, the first comparator outputs a turn-off signal, while when the detected voltage of the current sensing resistor is lower than the second reference voltage, the second comparator outputs a turn-on signal.

10. The liquid crystal display device according to claim 9, further comprising a third switch electrically connected to the light-emitting unit and the controller, respectively.

11. The liquid crystal display device according to claim 9, wherein the light-emitting unit is in the form of a light-emitting diode string.

12. The liquid crystal display device according to claim 9, wherein:
the first reference voltage of the first comparator is 5% higher than the predetermined, internal voltage of the controller; and
the second reference voltage of the second comparator is 5% lower than the predetermined, internal voltage of the controller.

13. The liquid crystal display device according to claim 9, wherein the circuit for automatic adjustment of current further comprises two resistors in series connection to each other at a connection point, which is electrically connected to the control terminal of the first switch, and
wherein an end of one resistor is connected to a DC voltage, and an end of the other resistor is connected to the ground.

* * * * *